F. F. BACKSTROM.
BELT FASTENER.
APPLICATION FILED JULY 1, 1919.
1,327,798.
Patented Jan. 13, 1920.
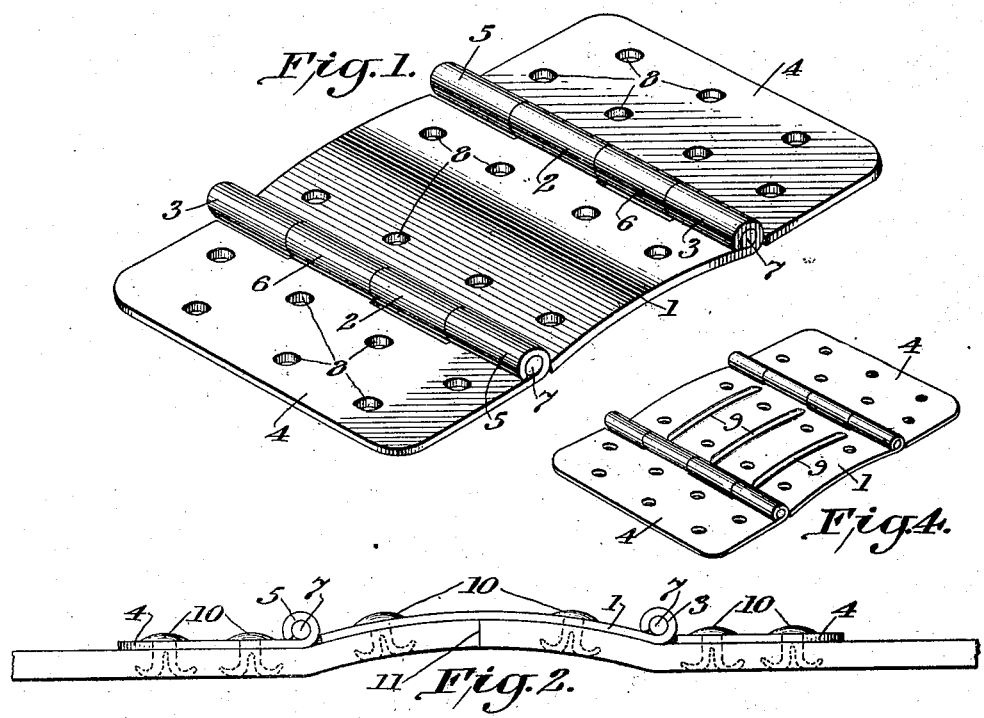
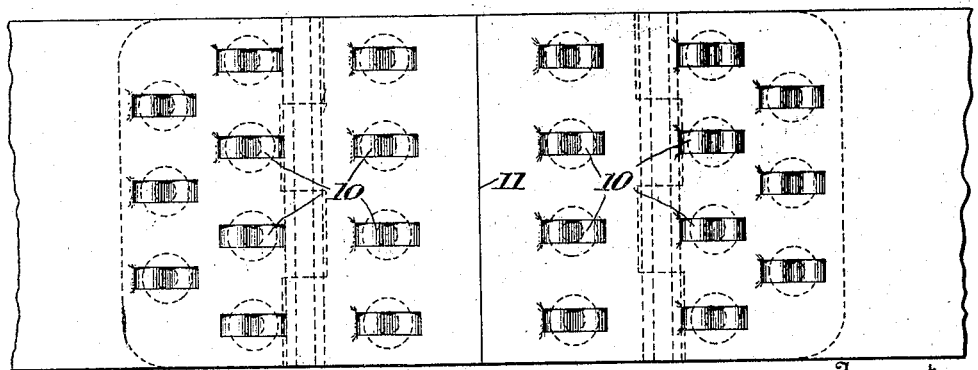
Inventor
Fridolf F. Backstrom
Frank F. Reid
By Edward S. Rogers
Attorneys

UNITED STATES PATENT OFFICE.

FRIDOLF F. BACKSTROM, OF CHICAGO, ILLINOIS, ASSIGNOR TO WESTERN FELT WORKS, OF CHICAGO, ILLINOIS, A CORPORATION OF WEST VIRGINIA.

BELT-FASTENER.

1,327,798.     Specification of Letters Patent.     Patented Jan. 13, 1920.

Application filed July 1, 1919. Serial No. 308,029.

*To all whom it may concern:*

Be it known that I, FRIDOLF F. BACKSTROM, a citizen of the United States, residing at Chicago, in the county of Cook and State of Illinois, have invented certain new and useful Improvements in Belt-Fasteners, of which the following is a specification.

One object of this invention is to provide a belt-fastener, adapted for use with power belts, which provides means for so joining the ends of the belt that they will abut, thus in effect forming a continuous piece of belting and avoiding the fault incident to the use of those fasteners of which I am aware of allowing a space between the joined ends of the belt which permits the entrance of air between the belt and pulley and causes slipping and loss of power and interrupts the continuity of the drive of the belt.

A further object of the invention is to provide a belt-fastener which is simple and cheap in construction and easy of application to the ends of a belt, and which may be made of light weight material, such as sheet-metal without sacrificing anything of strength and utility.

To this end the invention consists in a belt-fastener having a central portion adapted to overlie the abutting ends of the belt and to which such ends are preferably fastened. This central portion having flexibly connected with it end portions which afford additional means of attachment to the belt, all as I will proceed now to explain and finally claim.

In the accompanying drawings illustrating the invention, in the several figures of which like parts are similarly designated, Figure 1 is a perspective view of the belt fastener. Fig. 2 is an edge view of the fastener attached to a belt. Fig. 3 is a bottom view of a belt showing the fastener in dotted lines attached thereto; and Fig. 4 is a perspective view showing a modification of the invention.

The fastener comprises a central portion 1 provided with hinge members 2 and 3, and end portions 4 provided with hinge members 5 and 6 adapted to coöperate with the members 2 and 3 to form in conjunction with pintles 7 flexible joints between the central and end portions. These pintles 7 may be driven out to disconnect the portions.

It will be seen that, in the device as shown, the end portions 4 are alike and interchangeable, thus obviating the necessity for rights and lefts.

The central portion 1 may be curved or arcuate, as shown, for the purpose in conjunction with the joints of allowing the belt to conform to the curvature of the pulley face over which the belt runs.

The central and end portions are all provided with holes 8 for the reception of fastening means.

If desired, the central portion may be provided with strengthening ribs 9, as shown in Fig. 4.

In attaching the fastener to the ends of a belt, such ends are brought snugly together, as shown in Figs. 2 and 3, centrally of the central portion 1 and the ends then securely attached to the central portion 1 and the end portions 4 by means of rivets 10 or other suitable fastenings passing through the belt and the holes 8 in the belt fastener and clenched either upon the upper face of the fastener or upon the under or working face of the belt.

I have said that the abutting line 11 of the belt ends should be located centrally of the portion 1, but it is obvious that such exact location thereof is not essential, it being sufficient if allowance is made for adequate material through which to pass the rivets of the portion 1, the main driving strain being taken by the portions 4. But, in any event, the ends of the belt should be brought snugly together so as to exclude air from between the belt and pulley as the joined ends pass over such pulley.

It is not absolutely necessary that the ends of the belt be attached to the central portion, because, as stated, the driving strain is taken mainly by portions 4; but such attachment is preferable.

If desired the ends of the belt may be skived and spliced under the portion 1 but I do not deem this necessary to proper functioning of the device.

The fastener may be made in a variety of widths and of varying weights to suit the breadth and weight of the belt to be joined, and the curvature of the portions 1 may be varied to adapt it to the diameter of pulley to be used.

It will thus be seen that I provide a belt-fastener of exceedingly simple construction and of general application, and one which is capable of being easily repaired, the substitution of new parts for damaged ones being easily accomplished by removal of the pintles 7. And furthermore, a belt the ends of which are joined with this fastener is in effect continuous thus always presenting an unbroken frictional driving surface to the pulleys, whereby slipping of the belt thereon is eliminated.

Various changes in details of construction are to be understood as contemplated within the spirit of the invention and the scope of the following claims, as it is apparent that the device may assume a variety of forms without departing from the invention.

What I claim is:

1. A belt-fastener comprising an arcuate central portion adapted to overlie the meeting ends of a belt and provided with means flanking said meeting ends for permanent attachment to the belt, end portions hingedly and removably secured to said central portion, and means for securing said end portions to the belt.

2. A belt-fastener, comprising an arcuate central portion, end portions flexibly connected therewith, said fastener adapted to connect a belt with its ends abutting under said central portion, and means for attaching said central and end portions to said belt.

In testimony whereof I affix my signature in presence of two witnesses.

FRIDOLF F. BACKSTROM.

Witnesses:
HENRY FAUROT, Jr.,
F. C. HALPIN.